April 8, 1969

W. HERTL 3,437,443

METHOD FOR MAKING FIBERS OF TITANIUM CARBIDE
AND OF TITANIUM DIOXIDE

Filed July 17, 1967

INVENTOR.
WILLIAM HERTL
BY
*Clinton S. Janes, Jr.*
ATTORNEY

United States Patent Office 3,437,443
Patented Apr. 8, 1969

3,437,443
METHOD FOR MAKING FIBERS OF TITANIUM
CARBIDE AND OF TITANIUM DIOXIDE
William Hertl, Corning, N.Y., assignor to Corning Glass
Works, Corning, N.Y., a corporation of New York
Filed July 17, 1967, Ser. No. 653,689
Int. Cl. C01g 23/4
U.S. Cl. 23—202                                               6 Claims

ABSTRACT OF THE DISCLOSURE

This invention relates to the production of microscopic fibers of titanium carbide and, more particularly, to the production of such fibers through the reaction of carbon and titanium dioxide at high temperatures in an atmosphere containing chlorine. Such fibers may be subsequently oxidized to yield fibers of titanium dioxide.

---

The use of inorganic fibers as reinforcing elements in plastics, rubber, glass, ceramics, and metals has been given great impetus in recent years by the demands of the electrical, mechanical, and aircraft industries for stronger materials which will be resistant to chemical attack and not experience any substantial loss in strength in high temperature service applications. The commercially available glass fibers have not exhibited the desired resistance to corrosion or the ability to retain high strength at elevated temperatures.

Crystalline titanium carbide (TiC) is well-recognized as being quite inert toward many of the chemical reagents which enjoy widespread use in commerce and, also, as exhibiting extremely high hardness and refractoriness. Hence, fibers composed of TiC crystals would be expected to exhibit the very desirable combination of properties of high strength, high refractoriness, and chemical inertness such as to be particularly suitable for reinforcing elements in plastics, rubber, glass, ceramics, and metals. Their inertness to the common acids and bases has also recommended their use in filter elements.

I have discovered that microscopic fibers of TiC, i.e., fibers having diameters of about 0.1–0.5 microns with lengths generally ranging about 5–100 microns, can be produced through the reaction of carbon and titanium dioxide ($TiO_2$) in an atmosphere containing chlorine.

Figure 1:
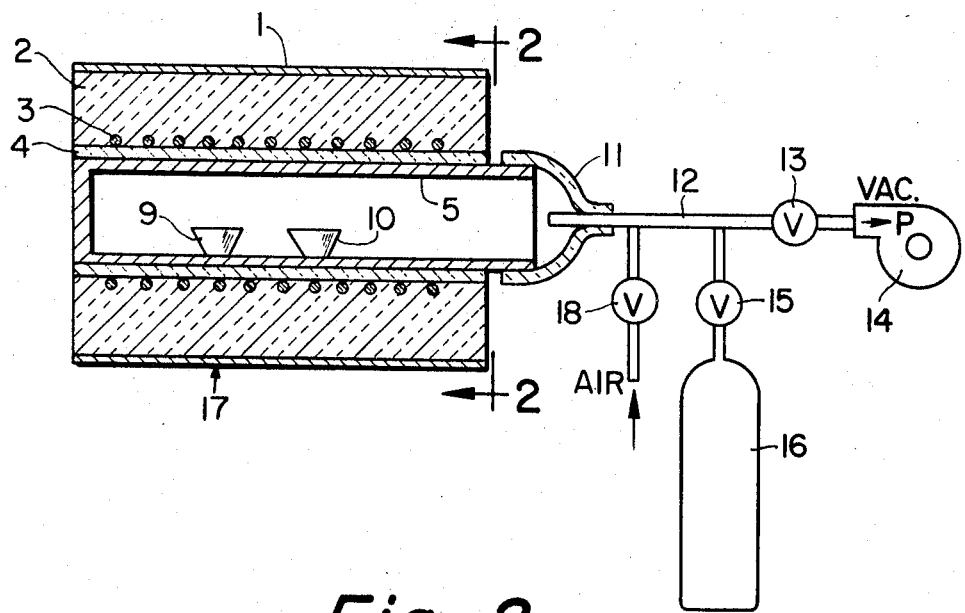
FIGURE 1 is a diagrammatic arrangement of apparatus suitable for producing fibers of TiC crystals according to the present invention.

In more specific terms, my invention contemplates heating $TiO_2$ and carbon within a particular temperature range in an atmosphere wherein controlled partial pressures of chlorine are introduced for a sufficient length of time to develop the desired fibers. I have learned that reaction temperatures between about 1250°–1500° C. promote the growth of fibers while partial pressures of chlorine ranging between about 50 mm. of mercury to atmospheric pressure (760 mm. of mercury) and even greater pressures are useful. The rate of fiber growth is dependent upon the temperatures and pressures utilized, short times (3–10 hours) being required at high temperatures and pressures while as much as 48 hours may be required at low temperatures and pressures.

When chlorine is permitted to react with $TiO_2$ at elevated temperatures, the following reversible reaction takes place:

$$TiO_2 + 2Cl_2 \rightleftharpoons TiCl_4 + O_2$$

When oxygen is added to the system, the equilibrium is shifted to the left. Conversely, if the oxygen is removed from the system, the reaction proceeds farther to the right. The above equation, as written, illustrates only the overall reaction occurring and does not indicate any intermediate reaction species. When this reaction is carried out commercially, as in the manufacture of $TiCl_4$, carbon or carbon monoxide is introduced into some part of the system to assure the reaction proceeding to the right.

My invention contemplates the carbon and $TiO_2$ in immediate relationship. This close proximity allows the intermediate species from the reaction (believed to be $TiCl_2$) to react on the carbon surface before it can react with a gaseous chlorine molecule to form $TiCl_4$. The carbon also acts to remove the oxygen produced by forming carbon monoxide. The reaction with the carbon surface yields TiC fibers.

The fundamental process steps of the preferred embodiment of my invention are four:

(1) charges of $TiO_2$ and carbon are placed within a heating chamber;

(2) the heating chamber is evacuated to an absolute pressure of not more than 1 mm. as the temperautre thereof is raised to the desired reaction temperature between 1250°–1500° C.;

(3) chlorine is introduced within the heating chamber at a partial pressure of at least about 50 mm. of mercury and the temperature of the heating chamber maintained within the reaction range for a time sufficient to attain the desired fiber growth (generally about 3–48 hours); and then (4) the fibers are cooled to room temperature.

I have learned that while maximum fiber growth is obtained when extremely pure starting materials are employed, excellent yields have been prepared where less pure raw materials were utilized. Thus, charcoal and coke have been found very satisfacory sources of carbon as have commercial or technical grades of $TiO_2$ as sources of $TiO_2$. The particle size of the $TiO_2$ and carbon affects the rate of reaction due to the surface area thereof available for reaction. Therefore, the particle size of the $TiO_2$ is preferably less than 10 mesh (2 mm.) United States Standard Screen Scale and the carbon is preferably less than 100 mesh (0.149 mm.) United States Standard Screen Scale.

Figure 2:
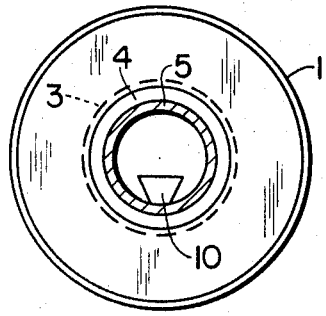
FIGURE 2 is a vertical sectional view along the lines 2—2 of FIGURE 1.

The examples recorded in Table I utilized a batch technique employing the static reaction system illustrated in FIGURES 1 and 2. However, since fiber growth is a continuing process, an apparatus could be designed for a dynamic reaction system whereby batches could be added and fiber growth removed such that a continuous process for growing fibers could be had.

Referring now specifically to FIGURES 1 and 2, a furnace, depicted generally in side elevation in cross-section at 17 comprises the heating chamber. This furnace consists essentially of an alumina or sillimanite refractory tube 4 wound with platinum or platinum-rhodium alloy wire 3 surrounded with insulation 2 which in turn is held in place by a steel casing 1. A closed-end inner or working liner 5, consisting of an alumina or sillimanite refractory tube, is employed to protect the wire-wound tube from mechanical abuse and corrosion during operation of the furnace and, at the same time, preventing contact of the starting materials and reaction products with the wire, thereby eliminating the hazard of a furnace failure. Working liner 5 extends beyond the front of furnace 17 and is there connected to a pipe 12 through a borosilicate glass joint 11. Pipe 12 leads to a vacuum pump 14 through valve 13 or to a source of air (not shown) through valve 18 or the source of chlorine gas introduced into pipe 12 through valve 15 from lecture bottle 16. Alumina refractory trays or "boats" 9 and 10 are placed within working liner 5 at predetermined positions such as to be exposed to the desired temperature within the reaction range. Boat 9 contains a charge $TiO_2$ and boat 10 a charge of carbon.

In the following examples, boats 9 and 10 were filled with their respective charges and positioned in working liner 5 at predetermined points. Boat 9 contained powdered $TiO_2$ and boat 10 contained colloidal carbon. Pipe 12 was connected to working liner 5 through glass joint connector 11. Valve 13 was opened and valves 15 and 18 closed. The furnace was then heated up until the desired temperature was attained in the area of boats 9 and 10, a vacuum being applied through vacuum pump 14 to evacuate the furnace chamber to an absolute pressure of not more than about 1 mm. of mercury. Thereafter, valve 13 was closed and valve 15 opened to allow chlorine gas from lecture bottle 16 to fill reaction tube 5 to a partial pressure of at least 50 mm. of mercury. The temperature was maintained for a predetermined length of time to promote fiber growth after which the furnace was cooled and brought to atmospheric pressure by air being introduced through valve 18, and the boats removed from the furnace and the fiber growth examined.

It will be appreciated that modifications in the design of the reaction chamber and in the sequence of operations may be made without departing from the ambit of the invention so long as the necessary interrelation of atmosphere, temperature, and time is observed.

As has been discussed above, the rate of fiber growth is temperature-dependent. Since the rate of fiber growth is so slow and the quantities produced so small, reaction temperatures below about 1250° C. are not deemed commercially practical. At reaction temperatures above about 1500° C., the yields of fibers decrease due to a reaction occurring between TiC and chlorine.

I have learned that the substantial elimination of oxygen from the reaction system is to be preferred since oxygen acts to oxidize the carbon in the charge. Therefore, although a satisfactory yield of fibers can be produced in a dynamic reaction system wherein a flow of chlorine gas is pressed over the charges as the heating chamber is being raised to the reaction temperatures such that the residual air in the chamber is flushed out before the reaction begins, it is more economical and efficient (and, in a static system, necessary) to draw a vacuum of less than about 1 mm. of mercury before or during the heating to reaction temperature.

The TiC fibers form anywhere in the reaction zone wherever carbon is available as a substrate. The fibers, themselves, range in color from gray to white. X-ray diffraction analyses have identified these fibers as being composed of TiC crystals. Although it has not been possible to measure the electrical conductivity of an individual fiber, a matte of fibers was demonstrated to be conducting. The published literature indicates that bulk TiC has about the same electrical conductivity as silicon metal.

Table I records the effect of variations in reaction atmospheres on fiber growth employing the apparatus described in FIGURES 1 and 2. In each example, reagent grade powdered $TiO_2$ and high purity colloidal carbon were used as starting materials and the chlorine gas was Lecture Bottle grade. Each description of fiber growth represents an attempt to rank the fiber yields by visual observation within the arbitrary series 1 to 10, wherein 10 signified the most desirable yield.

TABLE I

| Example No. | Chlorine pressure (mm.) | Temperature of reaction (° C.) | Time, hours | Description |
|---|---|---|---|---|
| 1 | (¹) | 1,275 | 24 | 0 |
| 2 | 50 | 1,275 | 8 | 0 |
| 3 | 50 | 1,275 | 24 | 0 |
| 4 | 50 | 1,275 | 48 | 1 |
| 5 | 100 | 1,275 | 8 | 0 |
| 6 | 100 | 1,275 | 24 | 1 |
| 7 | 200 | 1,275 | 8 | 0 |
| 8 | 200 | 1,275 | 24 | 1 |
| 9 | 300 | 1,275 | 8 | 0 |
| 10 | 300 | 1,275 | 24 | 2 |
| 11 | 500 | 1,275 | 8 | 0 |
| 12 | 500 | 1,275 | 24 | 3 |
| 13 | 700 | 1,275 | 8 | 0 |
| 14 | 700 | 1,275 | 24 | 4 |
| 15 | (¹) | 1,300 | 24 | 0 |
| 16 | 50 | 1,300 | 8 | 0 |
| 17 | 50 | 1,300 | 24 | 4 |
| 18 | 50 | 1,300 | 48 | 6 |
| 19 | 100 | 1,300 | 8 | 4 |
| 20 | 100 | 1,300 | 24 | 7 |
| 21 | 200 | 1,300 | 8 | 6 |
| 22 | 200 | 1,300 | 24 | 10 |
| 23 | 300 | 1,300 | 8 | 8 |
| 24 | 300 | 1,300 | 24 | 10 |
| 25 | 600 | 1,300 | 8 | 9 |
| 26 | 600 | 1,300 | 24 | 10 |
| 27 | (¹) | 1,350 | 24 | 0 |
| 28 | 50 | 1,350 | 4 | 0 |
| 29 | 50 | 1,350 | 8 | 0 |
| 30 | 50 | 1,350 | 16 | 2 |
| 31 | 50 | 1,350 | 40 | 6 |
| 32 | 100 | 1,350 | 4 | 0 |
| 33 | 100 | 1,350 | 8 | 1 |
| 34 | 100 | 1,350 | 16 | 4 |
| 35 | 100 | 1,350 | 40 | 9 |
| 36 | 200 | 1,350 | 4 | 0 |
| 37 | 200 | 1,350 | 8 | 2 |
| 38 | 200 | 1,350 | 16 | 5 |
| 39 | 200 | 1,350 | 30 | 8 |
| 40 | 200 | 1,350 | 40 | 9 |
| 41 | 300 | 1,350 | 4 | 2 |
| 42 | 300 | 1,350 | 15 | 5 |
| 43 | 300 | 1,350 | 30 | 10 |
| 44 | 600 | 1,350 | 4 | 3 |
| 45 | 600 | 1,350 | 8 | 8 |
| 46 | 600 | 1,350 | 16 | 10 |
| 47 | 600 | 1,350 | 40 | 10 |
| 48 | 700 | 1,350 | 4 | 4 |
| 49 | 700 | 1,350 | 16 | 10 |
| 50 | (¹) | 1,400 | 24 | 0 |
| 51 | 50 | 1,400 | 5 | 1 |
| 52 | 50 | 1,400 | 24 | 4 |
| 53 | 50 | 1,400 | 48 | 8 |
| 54 | 100 | 1,400 | 4 | 2 |
| 55 | 100 | 1,400 | 10 | 4 |
| 56 | 100 | 1,400 | 24 | 7 |
| 57 | 200 | 1,400 | 5 | 3 |
| 58 | 200 | 1,400 | 10 | 6 |
| 59 | 200 | 1,400 | 24 | 10 |
| 60 | 600 | 1,400 | 6 | 4 |
| 61 | 600 | 1,400 | 12 | 9 |
| 62 | (¹) | 1,475 | 24 | 0 |
| 63 | 50 | 1,475 | 2 | 1 |
| 64 | 50 | 1,475 | 8 | 2 |
| 65 | 100 | 1,475 | 4 | 4 |
| 66 | 100 | 1,475 | 16 | 6 |
| 67 | 200 | 1,475 | 10 | 5 |
| 68 | 200 | 1,475 | 16 | 8 |
| 69 | 600 | 1,475 | 6 | 2 |
| 70 | 600 | 1,475 | 10 | 10 |

¹ Vacuum of 1 mm.

Table I clearly demonstrates the need for a carrier gas and amply illustrates the effectiveness of chlorine in providing for the transport of the gaseous reactants. Also, Table I points out the criticality of the partial pressure of chlorine being at least 50 mm. of merucury since the yield of fibers is decreasing demonstrably at that pressure and illustrates that reaction temperatures between about 1300°–1400° C. and partial pressures of chlorine in excess of 100 mm. of mercury are to be preferred. Although the formation of TiC fibers is certainly dependent upon the transport of gaseous reactants, Table II illustrates that the function of the chlorine be both as a carrier gas and as a reactant to yield some sort of intermediate product which is converted to TiC. Thus, the inert gases hydrogen, helium, and argon result in no yields of fibers and the addition of halide gases such as HCl, HBr, and bromine produces only a very poor fiber growth.

TABLE II

| Example No. | H₂ | He | A | HCl | HBr | Br₂ | Temperature of reaction (°C.) | Time, hours | Description |
|---|---|---|---|---|---|---|---|---|---|
| 71 | 100 | | | | | | 1,350 | 16 | None |
| 72 | 600 | | | | | | 1,350 | 16 | None |
| 73 | | 100 | | | | | 1,350 | 16 | None |
| 74 | | 600 | | | | | 1,350 | 16 | None |
| 75 | | | 100 | | | | 1,350 | 16 | None |
| 76 | | | 600 | | | | 1,350 | 16 | None |
| 77 | | | | 100 | | | 1,350 | 16 | 1 |
| 78 | | | | 600 | | | 1,350 | 16 | 2 |
| 79 | | | | | 100 | | 1,350 | 16 | None |
| 80 | | | | | 600 | | 1,350 | 16 | 1 |
| 81 | | | | | | 100 | 1,350 | 16 | None |
| 82 | | | | | | 600 | 1,350 | 16 | 1 |

Nevertheless, although the inert gases do not cause a growth of fibers, they may be added to the reaction chamber as a carrier or different gas with little apparent harmful effect. The addition of a different gas such as helium is practically advantageous in that a total pressure of one atmosphere may be utilized within the reaction system without the need for a total atmosphere of chlorine. The ability to form fibers at a pressure of one atmosphere is useful not only in the static reaction system described in detail above and illustrated in the appended drawings, but also in a dynamic, gas-flowing system.

When these TiC fibers are heated in an oxidizing atmosphere such as air at temperatures of 800° C. and higher, the TiC is oxidized to $TiO_2$. The $TiO_2$ retains the fibrous form so, in this manner, $TiO_2$ fibers can readily be produced from the TiC fibers. Such fibers are particularly useful in paints since they act to thicken the paint as well as impart the well-recognized pigment effect thereto.

I claim:

1. A method for making microscopic fibers containing titanium carbide crystals comprising the steps of:
   (a) providing a charge of $TiO_2$ in close relation to a charge of carbon in a reaction chamber;
   (b) heating said chamber to about 1250°–1500° C. and removing essentially any oxygen present in said chamber;
   (c) contacting said charges at 1250°–1500° C. with an atmosphere containing chlorine, said chlorine having a partial pressure of at least about 50 mm. of mercury;
   (d) maintaining said temperature and atmosphere for a period of time sufficient to attain the desired fiber formation; and then
   (e) cooling said fibers to room temperature, and wherein said fibers have diameters ranging between about 0.1–5 microns and lengths ranging about 5–100 microns.

2. A method according to claim 1 wherein oxygen is essentially removed from the reaction chamber by evacuating said chamber to an absolute pressure of not more than about 1 mm. of mercury.

3. A method according to claim 1 wherein the atmosphere consists of a mixture of chlorine and an inert gas selected from the group consisting of hydrogen, helium, and argon.

4. A method according to claim 1 wherein the partial pressure of chlorine ranges about 50–760 mm. of mercury.

5. A method according to claim 1 wherein the time sufficient to attain the desired fiber formation ranges about 3–48 hours.

6. A method according to claim 1 wherein said fibers containing titanium carbide crystals are heated in an oxidizing atmosphere to a temperature of at least 800° C. to convert such fibers to fibers containing $TiO_2$.

References Cited

UNITED STATES PATENTS

| | | | |
|---|---|---|---|
| 2,980,510 | 4/1961 | Berry | 23—202 |
| 3,065,091 | 11/1962 | Russell et al. | 23—202 XR |
| 3,161,473 | 12/1964 | Pultz | 23—208 |
| 3,244,481 | 4/1966 | Berry | 23—202 |
| 3,329,484 | 7/1967 | Long et al. | 23—202 |
| 3,338,677 | 8/1967 | Berry | 23—202 |
| 3,385,669 | 5/1968 | Clifton et al. | 23—208 |
| 3,395,091 | 7/1968 | Sinclair | 23—142 XR |

OTHER REFERENCES

"Nouveau Traité de Chimie Minérale," Tome IX (1963), p. 156, by Paul Pascal. Masson et Cie, Editeurs, Paris, France.

EDWARD STERN, *Primary Examiner.*

U.S. Cl. X.R.

23—208; 106—39, 43